April 25, 1944.  R. C. PAULY  2,347,431
FEATHER HANDLING APPARATUS
Filed Dec. 24, 1942  2 Sheets-Sheet 1
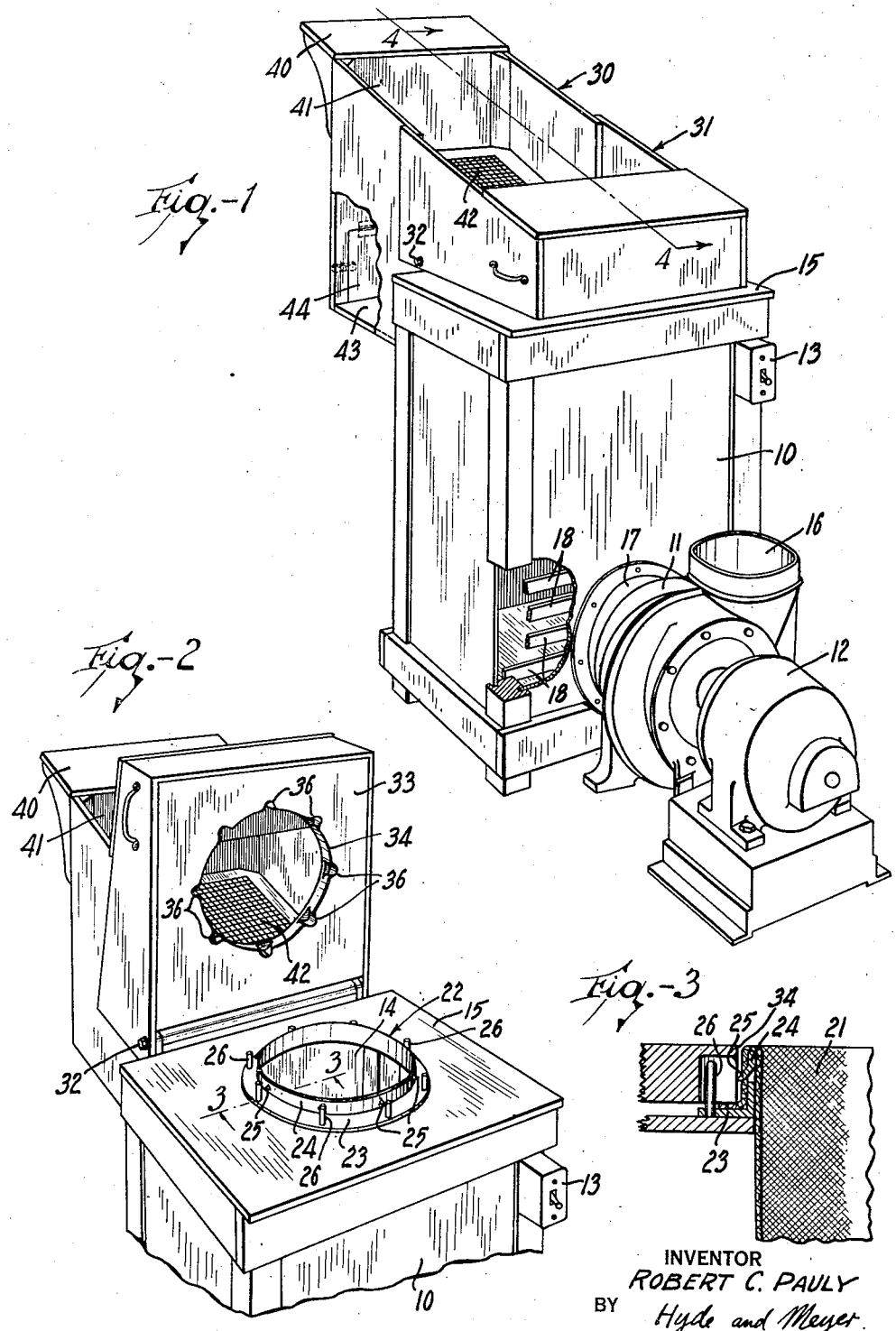
INVENTOR
ROBERT C. PAULY
BY Hyde and Meyer
ATTORNEYS.

Patented Apr. 25, 1944

2,347,431

UNITED STATES PATENT OFFICE 2,347,431

FEATHER HANDLING APPARATUS

Robert C. Pauly, Cincinnati, Ohio, assignor to The American Laundry Machinery Company, Cincinnati, Ohio, a corporation of Ohio Application December 24, 1942, Serial No. 470,009

4 Claims. (Cl. 19—72)

This invention relates to improved handling and transfer means for use in connection with cleaning, renovating, or otherwise treating feathers or other material of a nature such that it can be carried, on an air stream. The apparatus will be herein described with specific reference to the treatment of feathers, although it will be apparent that it may be used for related purposes and with other similar materials.

The invention particularly relates to improved apparatus whereby the feathers, or the like, are unloaded from their original tick or container into a processing receptacle to be processed in said receptacle, and are returned to such original container after processing, all with a minimum amount of handling or personal attention by an operator, and with no physical contact between the motive source, such as rotating fan blades or blower vanes, and the feathers. The sole conveying force is directly applied by means of the fluid stream.

One object of the present invention is to provide improved apparatus for effecting the transfer of the feathers, or the like, from the pillow or tick to the processing receptacle, and for returning the processed feathers to the original container.

The particular methods and means used in processing the feathers after they are transferred to the processing bag form no part of the present invention, and reference to the actual processing will be here made only to an extent necessary to describe the function of apparatus herein claimed.

Objects and advantages of my improved transfer apparatus other than those already referred to will be apparent from the following description, in conjunction with the accompanying drawings wherein I have shown one embodiment of my invention. The essential features of the invention are set forth in the appended claims.

In the drawings:

Fig. 1 is a perspective view of a feather transfer device embodying my invention, showing the parts in operating position;

Fig. 2 is a perspective view, partly broken away, showing the parts in position for applying or removing a bag;

Fig. 3 is a section taken on the line 3—3 of Fig. 2, but showing a fragmentary portion of a processing receptacle or bag, retained in operating position.

Figure 4:
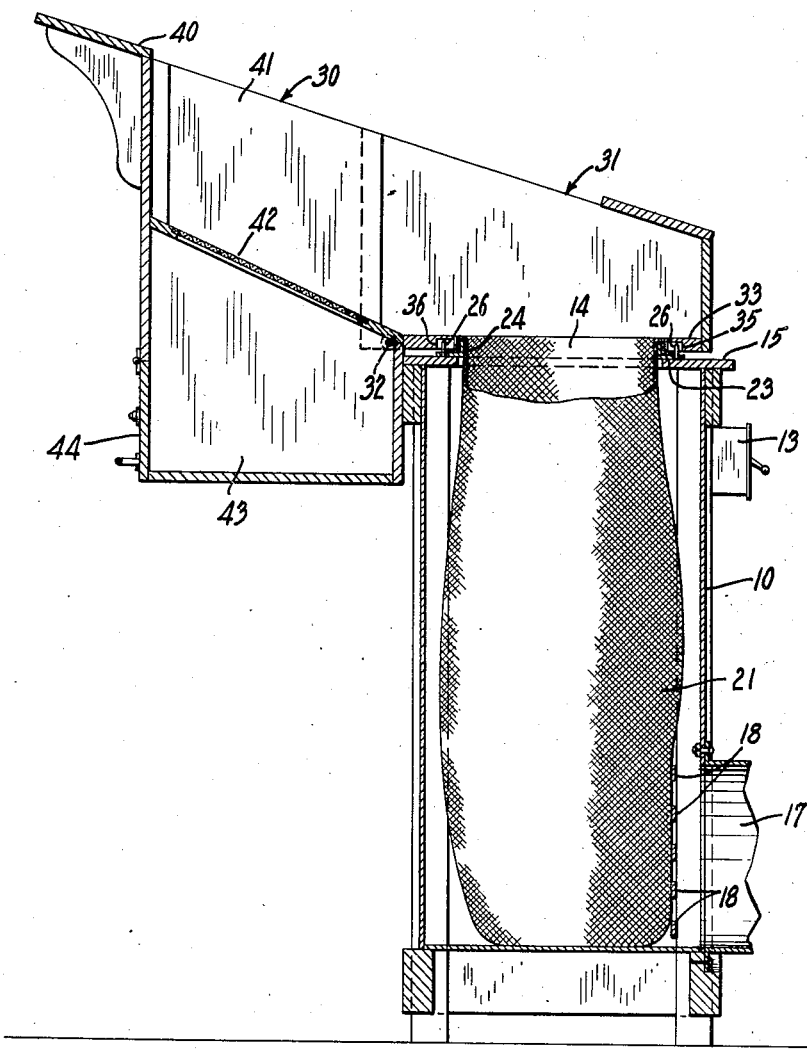
Fig. 4 is a vertical section taken on the line 4—4 of Fig. 1.

In the drawings, and referring particularly to Fig. 1, the feather transfer assembly is shown as housed in and carried by a supporting device such as a cabinet 10. A blower assembly 11 is powered by a motor 12 responsive to a switch 13, and normally provides an air draft through the cabinet, the air intake 14 being positioned in the top wall 15 of the cabinet. The air is exhausted through an outlet 16 in the blower housing. The space immediately in front of the blower intake 17 is provided with cross bars or louvres 18 to prevent the feather processing bag from being drawn into said blower intake.

The aperture 14 in the top wall 15 of the cabinet 10 is large enough to permit insertion therethrough of the feather processing bag 21 (Fig. 4). The aperture 14 is defined by an annulus or collar 22 which has a horzontal flange portion 23 affixed to the cabinet top 15 and a vertical flange portion 24 provided around its outer face with a number of spaced, pointed projections or spurs 25. The operator inserts the bag, closed end first, through the aperture and rolls the open edge of the bag over flange 24 in such manner that the bag edge is hooked over spurs 25 so as to retain the bag against the suctional drag of the blower draft. Guard means such as the upward projections 26 safeguard the hands of the operator from accidental contact with the points of spurs 25.

A feather receiving hopper is provided to receive and direct the feathers into bag 21. The hopper comprises two portions, namely a fixed portion 30 rigidly connected to cabinet 10 and a movable portion 31 hingedly connected to the fixed portion 30 by means of hinge pintle 32. The movable portion, of bin like contour, has a bottom wall 33 provided with a generally circular aperture 34 designed to seat snugly downwardly around flange 24 of the annulus 22 when the parts are in the position shown in Fig. 1. Notched out portions 36 (Figs. 2 and 3) around the edge of aperture 34 provide clearance in the neighborhood of the upright guard posts 26. It is therefore apparent that when the hinged portion 31 is lowered to the position shown in Fig. 1 it engages the edge portion of the bag 21 and supplements the retaining effect of spurs 25. It also substantially seals the crevice between the hopper bottom 33 and the opening 14.

The operation of the device is as follows. With the movable portion 31 of the hopper in the elevated position shown in Fig. 2, the processing bag is lowered into the aperture 14 and attached around its open edge to spurs 25 as described immediately above. The movable portion 31 of the hopper is then lowered to the position shown in Fig. 2 and the motor 12 is started by means of switch 13.

A tick or container of feathers to be processed is placed on shelf 40 carried by stationary part 30, and the feathers are poured into the open top 41 of the hopper. The suction created by the action of blower 11 draws the feathers across grating 42 and into processing bag 21. The purpose of grating 42 is to permit particles of solid matter unintentionally mixed with the feathers, such as pins, broken quills, heavy dirt, or other foreign matter, to drop by gravity through the grating into a compartment 43 whence they may later be withdrawn through door 44 (Fig. 1). When the feathers have all been drawn into the processing bag, the bag may be removed and secured for transmittal to the actual cleaning or processing apparatus.

After processing, a cleaned tick or receptacle is introduced through aperture 14 and secured as before. The bag of cleaned feathers is then placed on shelf 40 and the feathers drawn into their original container in the manner heretofore described.

What I claim is:

1. Apparatus of the character described, comprising a support having an opening therein, bag holding means surrounding said opening, whereby a work-receiving air-permeable bag may be suspended from said support, a hopper in communication with said opening, said hopper having a stationary portion for receiving feathers or the like, and a swinging portion hinged to said stationary portion and cooperating therewith when in operative position to direct said feathers into said opening, and when in inoperative position to permit insertion or removal of a bag, and means for directing an air current through said hopper and thence through said opening for conveying feathers placed in said hopper, said stationary portion of said hopper having perforations in a bottom wall thereof whereby relatively heavy foreign particles entrained with said feathers drop by gravity through said perforations.

2. Apparatus of the character described, comprising a support having an opening therein, bag holding means surrounding said opening, whereby a work-receiving air-permeable bag may be suspended from said support, a hopper in communication with said opening, said hopper having a stationary portion for receiving feathers or the like, and a swinging portion hinged to said stationary portion and cooperating therewith when in operative position to direct said feathers into said opening, and when in inoperative position to permit insertion or removal of a bag, and means for directing an air current through said hopper and thence through said opening for conveying feathers placed in said hopper.

3. Apparatus of the character described, comprising a cabinet having inlet and outlet apertures, bag holding means surrounding said inlet aperture and consisting of a collar having a raised peripheral flange portion, spaced bag holding spurs carried by said collar, each such spur having guard means in juxtaposition thereto, whereby a work-receiving bag may be suspended within said cabinet with its open end in peripheral contact with said flange and removably retained by said spurs, a receiving hopper for feathers or the like in communication with said inlet aperture, said hopper having a stationary member for receiving feathers or the like and a swinging member hinged to said stationary member and cooperating therewith, when in operative position, to direct feathers into said opening, and means for directing an air current through said hopper and thence through said opening for conveying the feathers placed in said hopper, said swinging hopper member having a wall portion provided with an aperture disposed to surround said collar when the swinging member is in operative position and assist in the retention of the open edge of a bag.

4. Apparatus of the character described, comprising a cabinet having inlet and outlet apertures, bag holding means surrounding said inlet aperture and consisting of a collar having a raised peripheral flange portion, spaced bag holding spurs carried by said collar, each such spur having guard means in juxtaposition thereto, whereby a work-receiving bag may be suspended within said cabinet with its open end in peripheral contact with said flange and removably retained by said spurs, a receiving hopper for feathers or the like in communication with said inlet aperture, said hopper having a stationary member for receiving feathers or the like and a swinging member hinged to said stationary member and cooperating therewith, when in operative position, to direct feathers into said opening, and means for directing an air current through said hopper and thence through said opening for conveying the feathers placed in said hopper, said swinging hopper member having a wall portion provided with an aperture disposed to surround said collar when the swinging member is in operative position and assist in the retention of the open edge of a bag, said stationary member of said hopper having perforations in a bottom wall thereof whereby relatively heavy foreign particles entrained with said feathers drop by gravity through said perforations.

ROBERT C. PAULY.